United States Patent [19]

Matsuda et al.

[11] 4,016,121

[45] Apr. 5, 1977

[54] AQUEOUS POLYURETHANE HAVING BLOCKED NCO GROUPS AND PROCESS

[75] Inventors: Kazuo Matsuda; Hidemasa Ohmura; Takeyo Sakai, all of Wakayama, Japan

[73] Assignee: Kao Soap Co., Ltd., Tokyo, Japan

[22] Filed: July 12, 1976

[21] Appl. No.: 704,614

[30] Foreign Application Priority Data

July 22, 1975  Japan .............................. 50-89447

[52] U.S. Cl. .................. 260/29.2 TN; 260/75 NH; 260/77.5 AM; 260/77.5 TB
[51] Int. Cl.² ..................... C08G 18/80; C08J 3/06
[58] Field of Search ............ 260/77.5 AM, 75 NH, 260/77.5 TB, 29.2 TN

[56] References Cited

UNITED STATES PATENTS

| | | | |
|---|---|---|---|
| 3,723,372 | 3/1973 | Wakimoto et al. | 260/29.2 TN |
| 3,799,854 | 3/1974 | Jerabek | 260/29.2 TN |
| 3,836,493 | 9/1974 | Matsuda et al. | 260/29.2 TN |
| 3,897,377 | 7/1975 | Broecker et al. | 260/29.2 TN |
| 3,903,031 | 9/1975 | Matsuda et al. | 260/29.2 TN |
| 3,903,032 | 9/1975 | Matsuda et al. | 260/29.2 TN |
| 3,928,271 | 12/1975 | Matsuda et al. | 260/29.2 TN |
| 3,932,561 | 1/1976 | Zamer | 260/29.2 TN |
| 3,947,338 | 3/1976 | Jerabek et al. | 260/29.2 TN |
| 3,951,897 | 4/1976 | Matsuda et al. | 260/29.2 TN |

*Primary Examiner*—Murray Tillman
*Assistant Examiner*—Arthur H. Koeckert
*Attorney, Agent, or Firm*—Woodhams, Blanchard and Flynn

[57] ABSTRACT

An aqueous polyurethane emulsion is prepared by reacting a polyhydroxyl component containing 15 to 80% by weight of a polyoxyethylene glycol having a molecular weight of 200 to 10,000 with an excess of an organic polyisocyanate to obtain an isocyanate-terminated urethane prepolymer, reacting that prepolymer with an excess of a polyalkylene polyamine thereby to form a polyurethane-urea-polyamine, reacting the free amino groups in the polyurethane-urea-polyamine with a blocked polyisocyanate having a single free isocyanate group, and mixing the resulting product with water, or reacting said resulting product with a cyclic dicarboxylic acid anhydride followed by mixing with water.

8 Claims, No Drawings

AQUEOUS POLYURETHANE HAVING BLOCKED NCO GROUPS AND PROCESS

BACKGROUND OF THE INVENTION

1. Field of the Invention

The present invention relates to a process for preparing an aqueous polyurethane emulsion, and more particularly, to a process for preparing a homogeneous and stable self-emulsified polyurethane emulsion.

2. Description of the Prior Art

Various processes are known for preparing polyurethane emulsions, for example, by preparing a urethane prepolymer having terminal isocyanate groups from a polyhydroxyl compound and an excess of an organic polyisocyanate, chain-extending said urethane prepolymer using a chain extender which contains a tertiary amino group thereby to obtain a polyurethane composition containing a tertiary amino group, and quaternizing said tertiary amino group, followed by mixing with water, or by mixing with an aqueous solution of acid, in order to prepare a so-called self-emulsified polyurethane emulsion which does not contain an emulsifier.

Another process of preparing a polyurethane emulsion consists of, for example, dispersing a polyurethane composition in water in the presence of an emulsifier.

Polyurethane resins, in general, have excellent physical and chemical properties. But the polyurethane resin films obtained from a polyurethane emulsion prepared by the aforesaid conventional processes exhibit relatively poor physical and chemical properties, as compared to the crosslinked polyurethane resins, because it is difficult to effect chemical cross-linking of the polymers, and the emulsifier remaining in the polyurethane resin causes the resin to exhibit poor properties.

Polyurethane polymers having firm crosslinking usually are very difficult to handle in the preparation steps because of their non-melting and non-soluble properties, and in many cases, handling is impossible. Therefore, it is almost impossible to prepare emulsions by dispersing such polymers in water. Even if they are dispersed in water, the polyurethane emulsions thus prepared often tend to be very unstable.

SUMMARY OF THE INVENTION

We have discovered a process of preparing an aqueous emulsion containing a polyurethane resin and having good physical and chemical properties, without introducing cross-link bonds into the resin before the urethane resin is dispersed in water, and without increasing the molecular weight of the polymer so much as to decrease the stability of the emulsion and without using large amounts of an emulsifier. Our invention provides a self-emulsifiable polyurethane emulsion having a functional group which is capable of forming crosslinks.

According to our invention, there is introduced into a polyurethane resin, obtained in the form of an aqueous emulsion, an isocyanate-reproducing compound (blocked isocyanate) which is effective as a reactive functional group that can form crosslinks when the urethane resin is heat-treated.

We have succeeded in obtaining a stable, self-emulsifiable and self-crosslinkable emulsion containing a polyurethance resin having excellent physical and chemical properties, by reacting a polyhydroxyl component comprised of 15 to 80% by weight of a polyoxyethylene glycol of a molecular weight of 200 to 10,000 with an excess of an organic polyisocyanate to obtain an isocyanate-terminated urethane prepolymer, reacting that prepolymer with an excess amount of a polyalkylene polyamine thereby to form a polyurethane-urea-polyamine, reacting the free amino groups in the polyurethane-urea-polyamine with a blocked polyisocyanate having a free isocyanate group, and mixing the resulting product with water, or reacting said resulting product with a cyclic dicarboxylic acid anhydride followed by mixing with water.

The polyurethane resin obtained by drying the polyurethane emulsion according to the present invention, undergoes a thermo-setting reaction when it is heated whereby to form crosslinks, thereby improving the properties of the polyurethane resin. Therefore, there is no need to maximize the molecular weight of the polymer in the emulsion to improve the properties of the polyurethane resin and, accordingly, the emulsion exhibits a very good stability.

The polyurethane-urea-polyamine used for the preparation of the composition of the present invention is obtained by reacting (A) an isocyanate-terminated urethane prepolymer, which is prepared from a polyhydroxyl component and an excess of polyfunctional isocyanate, with (B) a polyalkylene polyamine, preferably in a solvent of the ketone-type, such as acetone or methylethyl ketone.

Examples of polyfunctional isocyanates are aromatic and aliphatic diisocyanates, such as 1,5-naphthylenediisocyanate, 4,4'-diphenylmethanediisocyanate, 4,4'-diphenyldimethylmethanediisocyanate, di- and tetra-alkyldiphenylmethanediisocyanates, 4,4-dibenzylisocyanate, 1,3-phenylenediisocyanate, 1,4-phenylenediisocyanate, tolylenediisocyanate, chlorinated isocyanates, brominated isocyanates, phosphorus-containing isocynates, butane-1,4-diisocyanate, hexane-1,6-diisocyanate, dicyclohexylmethanediisocyanate, cyclohexane-1,4-diisocyanate, xylylenediisocyanate and lysinediisocyanate. In addition, triisocyanates, such as 1-methyl-benzole-2,4,6-triisocyanate, biphenyl-2,4,4'-triisocyanate, and triphenylmethanetriisocyanate can be used in combination with the foregoing diisocyanates.

In preparing the isocyanate-terminated urethane prepolymer to be used in the present invention, the polyhydroxyl component that is employed consists essentially of from 15 to 80 wt. % of polyoxyethylene glycol having a molecular weight of 200 to 10,000, and the balance is one or more different polyhydroxyl compounds having a molecular weight of 200 to 10,000. Examples of such different polyhydroxyl compounds conventionally used for the preparation of polyurethanes are polyethers, polyesters, polyesteramides, polyacetals, polythioethers, and polybutadiene glycols.

Examples of the known polyethers are homopolymers, copolymers and graft copolymers of tetrahydrofuran, propylene oxide and butylene oxide.

It is also possible to use homogeneous polyethers or mixed polyethers formed by consideration of hexanediol, methylhexanediol, heptanediol, or octanediol.

There can also be used glycols such as bisphenol A or adducts of bisphenol A with an alkylene oxide such as ethylene oxide or propylene oxide and their propoxylated or ethoxylated glycols.

Examples of the preferred polythioethers are a thioglycol alone, or a condensation product of a thioglycol with other glycols.

Examples of the polyacetals are water-insoluble polyacetals obtained, for example, from hexanediol and formaldehyde, or from a 4,4'-dioxyethoxydiphenyldimethylmethane and formaldehyde.

Typical examples of the polyesters are polyester glycols obtained by the dehydration condensation reaction of saturated and unsaturated low molecular weight glycols such as ethylene glycol, propylene glycol, 1,3-butanediol, 1,4-butanediol, neopentyl glycol, pentanediol, hexanediol, octanediol, 2-ethyl-1,3-hexanediol, 1,4-butynediol, bisphenol A, diethylene glycol, triethylene glycol, dipropylene glycol, and bisphenol A to which is added ethylene oxide or propylene oxide, and aliphatic, alicyclic, aromatic and heterocyclic saturated and unsaturated dibasic acids such as oxalic acid, malonic acid, succinic acid, glutaric acid, adipic acid, pimelic acid, azelaic acid, sebacic acid, phthalic acid, maleic acid, and fumaric acid, as well as polyester glycols obtained by the ring-cleavage polymerization of the cyclic ester compounds.

Therefore, in this invention, a polyoxyethylene glycol which is a hydrophilic polyhydroxyl compound is used together with a hydrophobic polyhydroxyl compound. It is critical that the polyoxyethylene glycol is 15 to 80 wt. % of the total polyhydroxyl component.

Also, if required, the aforesaid polyhydroxyl component can be used together with customary glycols, such as ethylene glycol, diethylene glycol, triethylene glycol, butanediol, propanediol, 1,6-hexanediol, neoprentyl glycol, and N-alkyldiethanolamine having $C_1$ to $C_{22}$ alkyl group.

The isocyanate-terminated urethane prepolymer used in the present invention is prepared in the presence or absence of a solvent. Where an aromatic polyisocyanate is used for reaction with the polyhydroxyl component, the reaction temperature is within the range of 50° to 100° C., and when an aliphatic or an alicyclic polyisocyanate is used, the reaction temperature is within the range of 70° to 130° C.

In preparing the isocyanate-terminated urethane prepolymer, it is preferred to select the amount of the polyisocyanate so that all the hydroxyl groups are reacted with the isocyanate groups. The ratio of the total number of moles of the isocyanate groups to the total number of moles of the reactive hydrogen atoms (OH groups) is preferably in the range of 1.1 : 1.0 to 5.0 : 1.0.

Examples of the polyalkylene polyamines used in the present invention are various polyalkylene polyamines including polyethylene polyamine, polypropylene polyamine and polybutylene polyamine.

More specifically, the polyalkylene polyamine used in the present invention is a polyamine in which the nitrogen atoms are bonded by groups of the formula $-C_nH_{2n}-$ wherein $n$ is an integer larger than 1, and in which from 2 to about 4 of such groups are contained in the molecule. The nitrogen atoms can be bonded to the adjacent carbon atoms in the $-C_nH_{2n}-$ group, but they are not bonded to the same carbon atoms. In short, the polyamines have the formula

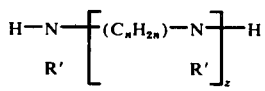

wherein $n$ is an integer larger than 1, $z$ is an integer of 2 to 4,

R' is hydrogen, alkyl having 1 to 4 carbon atoms, or a hydroxylalkyl ($C_1$–$C_4$) group.

Spcifically, there can be used polyamines such as diethylenetriamine, triethylenetetraamine, tetraethylenepentaamine and dipropylenetriamine, mixtures thereof and various polyamine materials. It is also possible to use hydroxyalkyl-substituted polyamines.

In some cases, in order to change the density of the hydrophilic groups in the polyurethane emulsion obtained by the present invention or to improve the performance of the polyurethane resin, it is desired to increase the distance between the amino groups in the polyurethane-urea-polyamine molecules. This can be attained by replacing a part of the polyalkylene polyamine with a hydrazine, ethylenediamine, propylenediamine, hexamethylenediamine, piperazine, phenylenediamine, and alkyl ($C_1$–$C_{22}$)-substituted diamines, alkylene oxide adducts of these diamines, acrylonitrile adducts of these diamines and acrylic ester adducts of these diamines.

For attaining the above object, up to less than about 50% of the polyalkylene polyamine can be replaced by the aforementioned diamines.

It is preferred that the reaction between the isocyanate-terminated urethane prepolymer and the polyalkylene polyamine is conducted under atmospheric pressure in a solvent of the ketone-type and at a reaction temperature ranging from −20° to +70° C.

Examples of the ketone-type solves are acetone, methylethyl ketone, diethyl ketone, dipropyl ketone, methylisobutyl ketone, and methylisopropyl ketone. The preferred solvents are acetone and methylethyl ketone.

The ketone-type solvent can contain a minor amount of benzene, tetrahydrofuran, dioxane, acetic acid ester, dimethyl formamide and chlorinated hydrocarbon solvent.

The reaction time is determined by the reaction temperature and the reactivity of the polyisocyanate compound. The reaction time is shorter or longer depending upon the reaction conditions. Completion of the reaction is confirmed when no absorption due to the isocyanate group is observed at 2250 cm$^{-1}$ in the infrared absorption spectrum of the reaction mixture. The reaction time usually ranges from 0.5 to 2 hours.

In reacting the urethane prepolymer with the polyalkylene polyamine, it is critical that the total number of the primary and secondary amino groups exceeds the total number of the isocyanate groups in the urethane prepolymer. As the total mole number of the amino groups becomes close to the total mole number of the isocyanate groups, there is formed a polyurethane-urea-polyamine of higher molecular weight, and a gelled product or a product that exhibits a high tendency of gellation is obtained. Also, if the mole number of the amino groups is excessive, the resulting polyurethane-urea-polyamine has a low molecular weight. It is not possible to obtain resins having excellent properties when the polyurethane emulsion is prepared using such products as an intermediate.

Accordingly, the ratio of the total number (B) of moles or the primary and secondary amino groups to the number of moles (A) of the isocyanate groups in $$1 < \frac{B}{A} \leq 5$$

and preferably, $$1 < \frac{B}{A} \leq 3.$$

It is also preferred that the molecular weight of the polyurethane-urea-polyamine is from 5,000 to 100,000.

The blocked polyisocyanate having a single free isocyanate group is obtained by the reaction of polyisocyanates with various isocyanate blocking agents. To impart the crosslinking property fo the urethane resin in the polyurethane emulsion prepared by using the above-obtained polyurethane-urea-polyamine as an intermediate, the blocked polyisocyanate having a single free isocyanate group is reacted with the free amino groups in said intermediate.

Preferred examples of the polyisocyanates used to prepare the blocked polyisocyanate are the aforementioned isocyanate-terminated urethane prepolymer and the polyisocyanates described above used for preparing the urethane prepolymer.

Examples of the isocyanate blocking agents are sulfites such as potassium hydrogen sulfite, sodium hydrogen sulfite; secondary amines such as diethylamine, dibutylamine, diphenylamine, butylphenylamine, phenylnapthylamine; tertiary alcohols such as tertiary-butyl-alcohol; amides such as stearic acid amide, acetic acid amide, acrylamide, acetanilide; phenol derivatives such as ethylphenol, t-butylphenol, hydroxybenzoic acid; lactams such as ε-caprolactam, δ-valerolactam, γ-butyrolactam, β-propiolactam; oximies such as methylethylketoxime, benzophenoneoxime, cyclohexanoneoxime, acetaldoxime, acetoxime; imides such as maleic acid imide, succinic acid imide, phthalic acid imide; mercaptans such as t-dodecylmercaptan, t-butylmercaptan, butylmercaptan, hexylmercaptan; active methylene compounds such as dimethyl malonate, diethyl malonate, methyl acetoacetate, ethyl acetoacetate, acetylacetone; and hydrogen cyanide, ethylene imine, glycidol, hydroxyamine, and pyrrolidone.

The polyisocyanate is reacted with an isocyanate blocking agent, usually in the presence or absence of a solvent, at a temperature of 20° to 150° C. for a period of 0.5 to 7 hours. It is important to select the amount of the isocyanate blocking agent so that one isocyanate group is left free in each molecule of the polyisocyanates. That is, it is possible to easily prepare a blocked polyisocyanate having one free isocyanate group by reaching about (P-1) mol of an isocyanate blocking agent with one mole of polyisocyanate having P units of free isocyanate groups in one molecule.

The thus-prepared blocked polyisocyanates having one free isocyanate group reacted with the free amino groups in the polyurethane-urea-polyamine. This reaction is preferably conducted at −20° to +70° C. for a period of 0.5 to 2 hours. The amount of said blocked polyisocyanate is in the range of from 0.2 to 1.0 moles of free isocyanate groups in said blocked polyisocyanate per one mole of the sum of the primary and secondary amino groups in said polyurethane-urea-polyamine.

A self-emulsified polyurethane emulsion can be obtained by mixing with water the thus-obtained polyurethane-urea having blocked isocyanate group, or by reacting the polyurethane-urea having blocked isocyanate group with a cyclic dicarboxylic acid anhyride and then mixing it with water. The organic solvent used for the reaction can be distilled off by heating; distillation of the solvent does not deteriorate the stability of the emulsion. The emulsion remains quite stable even if it is admixed with an acidic substance or a basic substance to adjust the pH value of the emulsion to from 2 to 11, which is a great advantage of a nonionic emulsion.

When the polyurethane-urea having a blocked isocyanate group, which is an intermediate of the polyurethane emulsion prepared by the present invention, contains free amino groups, the resulting polyurethane emulsion exhibits a pH value higher than 7. When the polyurethane-urea does not contain free amino groups, the pH value will be about 7. To obtain a polyurethane emulsion having pH value of less than 7, the polyurethane-urea having blocked isocyanate groups and amino groups is reacted with a cyclic dicarboxylic acid anhydride and then mixed with water. The amount of the cyclic dicarboxylic acid anhydride is from 0.3 to 1.0 moles per mole of the amino groups of the polyurethane-urea having a blocked isocyanate group. That is, the reaction of the primary and secondary amino groups of the polyurethane-urea having blocked isocyanate groups with a molar equivalent, based on the amino groups, of a cyclic dicarboxylic acid anhydride at 5° to 70° C. for a period of 0.5 to 2 hours, yields half-amide accompanied by the formation of carboxyl groups.

In this reaction, if the cyclic dicarboxylic acid anhydride is reacted in an amount of more than 50 mol % relative to the number of moles of the amino groups, the resulting polyurethane emulsion exhibits a pH of 7 or less. On the other hand, where the cyclic dicarboxylic acid anhydride is reacted in an amount of less than 50 mol %, the resulting polyurethane emulsion shows a pH of higher than 7.

In this way, polyurethane emulsions having any desired pH value can be prepared without adding free acidic substance or basic structure. The emulsions will usually exhibit a pH value in the range of 4.0 to 9.0. Examples of the cyclic dicarboxylic acid anhydrides ar maleic acid anhydride, succinic acid anhydride, phthalic acid anhydride, di-, tetra- and hexa-hydrophthalic acid anhydride, trimellitic acid anhydride and itaconic acid anhydride.

By heating the urethane resin obtained by drying the polyurethane emulsion of the present invention, at a temperature of 50° to 200° C., free isocyanate groups can be generated from the blocked isocyanates groups. These free isocyanate groups react with amino groups, amide groups, urethane bonds and urea bonds in the resin to form crosslinks whereby to greatly improve the properties of the urethane resin.

The thus-prepared self-emulsifiable and self-crosslinkable emulsion containing 5 to 50 wt. % of a polyurethane resin, can be incorporated into fibers, nonwoven fabrics, papers, leathers, rubber, woods, metals, concrete, gypsum, glass, glass fibers and plastics, or coated or sprayed onto their surfaces and dried, to improve their properties such as surface coating, adhesiveness and hand. Moreover, the emulsion of the present invention can be utilized in the field of civil engineering and as an adhesive agent. The polyurethane emulsion obtained by the present invention, free of emulsifier, is self-emulsifiable. But to further increase the emulsification stability of the emulsion, it is of course possible to add known emulsifiers within a range that does not greatly change the properties of the polyurethane resin.

The invention is further described below with reference to illustrative Examples, but it should be noted that the invention is not limited to these Examples. In the Examples, parts and percent are all by weight unless otherwise stated.

EXAMPLE 1

A. A flask equipped with a stirrer and a thermometer was charged with 174 parts of a mixture consisting of 2,4-tolylenediisocyanate and 2,6-tolylenediisocyanate at a weight ratio of 80 to 20, and 174 parts of methylethyl ketone. To the contents of the flask there was gradually added, over a period of 30 minutes, a solution composed of 348 parts of methylethyl ketone in which had been dissolved 87 parts of methylethyl ketoxime.

During this addition, the temperature of the reaction mixture in the flask rose from 17° to 35° C.

Then, to the reaction mixture was added 522 parts of methylethyl ketone and the reaction was conducted at 50° C. for 30 minutes, thereby to obtain a methylethyl ketone solution of a blocked isocyanate compound having one free isocyanate group per molecule.

The content of free isocyanate groups in the solution was 3.20%.

B. A round bottom flask equipped with a thermometer and a stirrer was charged with 40.5 parts of a dehydrated poly(ethyleneadipate) glycol having a hydroxyl value of 55.4, 40.4 parts of dehydrated polyoxyethylene glycol having a hydroxyl value of 55.6, 40.6 parts of benzene, and 13.9 parts of a mixture composed of 2,4-tolylenediisoyanate and 2,6-tolylenediisocyanate at a weight ratio of 80 to 20. The reaction was conducted at 75° C. for 2 hours with stirring, thereby to obtain a urethane prepolymer solution containing 2.48% of free isocyanate groups.

C. To another flask there were introduced 200 parts of acetone and 3.58 parts of diethylenetriamine, and then there was gradually added 100 parts of the above urethane prepolymer solution over a period of 15 minutes, and a reaction was carried out at 50° C. for 30 minutes thereby to obtain a polyurethane-urea-polyamine solution.

Measurement of a drop of the above reaction solution by an infrared absorption spectrum showed no absorption at 2250 cm$^{-1}$ due to the free isocyanate group, thus indicating that the reaction has completed.

To the polyurethane-urea-polyamine solution was added 41.2 parts of the solution of the blocked isocyanate compound prepared in step (A) above, and the reaction was carried out at 40° C. for 1 hour. To the reaction mixture was then added 750 parts of ion-exchanged water, and the solvent was distilled off on a hot water bath, under reduced pressure, at 55° C. The concentration was adjusted by the addition of ion-exchanged water to obtain a homogeneous and stable low-viscosity emulsion containing 10% of resin and having a pH of about 8.

The emulsion was flowed onto and spread on a polytetrafluoroethylene board having flat surfaces and dried with air, to obtain a uniform and soft rubbery film. The film after heat-treatment at 120° C. for 20 minutes exhibited the following mechanical properties:

| 100 % modulus | Tensile strength | Elongation |
|---|---|---|
| 13 Kg/cm$^2$ | 159 Kg/cm$^2$ | 780% |

COMPARATIVE EXAMPLE 1

To 303.6 parts of the polyurethane-urea-polyamine solution prepared in the same manner as in step (B) of Example 1 was added 690 parts of ion-exchanged water and the solvent was distilled off under reduced pressure on a hot water bath at 55° C. The concentration was adjusted by the addition of ion-exchanged water, to obtain a homogeneous emulsion of a resin content of 10% and having pH of about 8.

The film prepared using the emulsion and heat-treated in the same manner as in Example 1 showed the following mechanical properties:

| 100 % modulus | Tensile strength | Elongation |
|---|---|---|
| 10 Kg/cm$^2$ | 104 Kg/cm$^2$ | 810% |

Comparison of Example 1 with Comparative Example 1 indicates that the polymer film obtained in Example 1 (process of the present invention) exhibits superior mechanical properties.

Also, when immersed in water at 50° C. for 1 hour, the heat-treated film of Comparative Example 1 exhibited 580% (by weight) of swelling, whereas the heat-treated film of Example 1 showed 35% of swelling under the same conditions, which indicates that the polymer film obtained in Example 1 (process of the present invention) has excellent resistance against water.

EXAMPLE 2

To 303.6 parts of the polyurethane-urea-polyamine solution prepared in the same manner as in step (B) of Example 1 there was added 41.2 parts of a solution of the blocked isocyanate compound prepared in step (A) of Example 1, and the reaction was carried out at 40° C. for 1 hour. There was then added 15 parts of methylethyl ketone in which had been dissolved 1.33 parts of maleic acid anhydride and this mixture was reacted at 50° C. for another 1 hour.

To the reaction mixture was then added 780 parts of water, and the solvent was distilled off under reduced pressure, and the concentration was adjusted by the addition of water, to obtain a homogeneous and stable emulsion having a resin content of 10%.

The emulsion had a pH value of 5.5.

The film obtained from this emulsion and heat-treated in the same manner as described in Example 1 showed the following mechanical properties:

| 100 % modulus | Tensile strength | Elongation |
|---|---|---|
| 14 Kg/cm$^2$ | 147 Kg/cm$^2$ | 800% |

COMPARATIVE EXAMPLE 2

To 303.6 parts of the polyurethane-urea-polyamine solution prepared in the same manner as in step (B) of Example 1, there was added 4.43 parts of a maleic acid anhydride dissolved in 50 parts of methylethyl ketone. The mixture was reacted at 50° C. for 1 hour. Then to the reaction mixture was added 730 parts of water, and the solvent was distilled off under reduced pressure, and then the concentration was adjusted by the addition of water, to obtain a homogeneous emulsion of a resin content of 10%.

The emulsion had a pH of 5.5.

A film prepared from the emulsion and heat-treated in the same manner as in Example 1 showed the following mechanical properties;

| 100 % modulus | Tensile strength | Elongation |
|---|---|---|
| 10 Kg/cm$^2$ | 92 Kg/cm$^2$ | 890% |

Comparison of Example 2 with Comparative Example 2 indicates that the polymer film obtained in Example 2 (process of the pressent invention) exhibits better mechanical properties.

EXAMPLE 3

A. Into a round bottom flask there was added 147.9 parts of a mixture consisting of 2,4-tolylenediisocyanate and 2,6-tolylenediisocyanate at a weight ratio of 80 to 20, and to which was added 96.05 parts of an ε-caprolactam dissolved in 453 parts of methylethyl ketone, and the reaction was conducted at 70° C. for 1 hour, thereby to obtain a methylethyl ketone solution of a blocked isocyanate compound having a single free isocyanate group.

The solution showed a free isocyanate group content of 5.16%.

B. 40.7 Parts of a polyoxytetramethylene glycol having a hydroxyl value of 55.2, 40.4 parts of a polyoxyethylene glycol having a hydroxyl value of 55.6, and 13.4 parts of 1.6-hexamethylenediisocyanate were introduced into a round bottom of flask equipped with a thermometer and a stirrer, and reaction was carried out at 90° C. for 4.5 hours, to obtain a urethane prepolymer having a free isocyanate group content of 3.53%.

Then, to a separate round bottom flask were added 200 parts of methylethyl ketone and 3.56 parts of diethylenetriamine, and then there was further added, dropwise, with stirring over a period of 40 minutes, 70 parts of the above urethane prepolymer dissolved in 30 parts of benzene. During the dropwise addition, the temperature of the reaction mixture rose from 23° to 27° C.

The mixture was then heated at 50° C. and reacted for 30 minutes, to obtain a polyurethane-urea-polyamine solution.

To the above solution was then added 29.5 parts of a solution of the blocked isocyanate compound obtained in (A) above, and the reaction was effected at 50° C. for 40 minutes. To the resulting reaction product was further added 500 parts of water, and the organic solvent was distilled off under reduced presure, and the concentration was adjusted by the addition of water, to obtain a homogeneous and stable emulsion having a resin content of 15% and a pH value of about 7.5.

The heat-treated film prepared from the emulsion in the same manner as described in Example 1 showed the following mechanical properties:

| 100% modulus | Tensile strength | Elongation |
|---|---|---|
| 11 Kg/cm$^2$ | 127 Kg/cm$^2$ | 990% |

EXAMPLE 4

A. 34.8 Parts of a mixture consisting of 2,4-tolylenediisocyanate and 2,6-tolylenediisocyanate at a weight ratio of 80 to 20, which was dissolved in 197.2 parts of methylethyl ketone, was introduced into a round bottom flask, and there was added, dropwise, over a period of 30 minutes, a solution consisting of 82.8 parts of methylethyl ketone in which had been dissolved 14.6 parts of diethylamine, while cooling with ice at a temperature of 0° to 6° C. The mixture was then reacted at 50° C. for a period of 15 minutes, to obtain a blocked isocyanate compound solution having a free isocyanate group content of 2.55%.

B. 49.1 Parts of a dehydrated polyoxytetramethylene glycol (hydroxyl value 114.2), 100.9 parts of a dehydrated polyoxyethylene glycol (hydroxyl value 111.2), 75.0 parts of diphenylmethane-4,4'-diisocyanate, and 96.4 parts of methylethyl ketone were introduced into a round bottom flask equipped with a stirrer and a thermometer, and reacted at 75° C. for 2.5 hours, to obtain a urethane prepolymer solution having a free isocyanate group content of 3.80%.

To a separate flask were introduced 11.7 parts of triethylenetetramine and 300 parts of methylethyl ketone, and these were mixed homogeneously. To the above mixture there was then added, dropwise, over a period of 25 minutes, 150 parts of the aforesaid urethane prepolymer solution, and the mixture was reacted by heating at 50° C. for 40 minutes, to obtain a solution of polyurethane-urea-polyamine.

To the above solution was then added 272 parts of a solution of the blocked isocyanate compound obtained in step (A) above and a reaction was carried out at 60° C. for 30 minutes. To the reaction mixture was then added 930 parts of water, which was mixed homogeneously, and then the methylethyl ketone was distilled off on a hot water bath at 55° C. under reduced pressure, and then the concentration was adjusted by the addition of water to obtain a homogeneous and stable emulsion having a resin content of 15% and a pH of about 7.5.

The heat-treated film prepared from the emulsion in the same manner as described in Example 1 showed the following mechanical properties:

| 100% modulus | Tensile strength | Elongation |
|---|---|---|
| 13 Kg/cm$^2$ | 146 Kg/cm$^2$ | 710% |

EXAMPLE 5

A. 17.4 Parts of a mixture consisting of 2,4-tolylenediisocyanate and 2,6-tolylenediisocyanate at a weight ratio of 80 to 20 was introduced into a round bottom flask equipped with a stirrer and a thermometer, and there was added, dropwise, over a period of 25 minutes, a solution composed of 148.4 parts of methylethyl ketone in which was dissolved 19.7 parts of benzophenoneoxime, and the reaction was effected at 50° C. for 4 hours, to obtain a methylethyl ketone solution of a blocked isocyanate compound having a single free isocyanate group in one molecule.

The content of free isocyanate groups in the solution was 2.265.

B. 34.4 Parts of a dehydrated polyoxypropylene glycol (hydroxyl value 162.9), 50.5 parts of a polyoxyethylene glycol (hydroxyl value 111.2), and 51.3 parts of methylethyl ketone were introduced into a flask, and there was added 34.8 parts of a mixture consisting of 2,4-tolylenediisocyanate and 2,6-tolylenediisocyanate at a weight ratio of 80 to 20, and the reaction was conducted at 75° C. for 4 hours, to obtain a urethane prepolymer solution having a free isocyanate group content of 4.76%.

Into a separate flask were introduced 200 parts of methylethyl ketone and 6.87 parts of diethylenetriamine and these were mixed together. To the above mixture at 22° C. there was gradually added in a dropwise manner 100 parts of the above urethane prepolymer solution, over a period of 20 minutes. During the step of dropwise addition, the temperature of the reaction mixture rose to 27° C. The reaction mixture was then heated to 50° C. and reacted for 30 minutes, to obtain a polyurethane-urea-polyamine solution.

To the above solution was then added 41.2 parts of a solution of the blocked isocyanate compound obtained in step (A) above and a reaction was carried out at 40° C.

To the thus-obtained solution there was then added 450 parts of water, and the methylethyl ketone was distilled off on a hot water bath heated at 50° C. under reduced pressure, and the concentration was adjusted by the addition of water to obtain a homogeneous and stable emulsion having a resin content of 20%.

The heat-treated film prepared from the emulsion in the same manner as in Example 1 showed the following mechanical properties:

| 100% modulus | Tensile strength | Elongation |
|---|---|---|
| 10 Kg/cm² | 131 Kg/cm² | 800% |

EXAMPLE 6

39 Parts of a dehydrated poly(butyleneadipate) glycol (hydroxyl value 115.2), 80.7 parts of a polyoxyethylene glycol (hydroxyl value 55.6), and 27.8 parts of a mixture consisting of 2,4-tolylenediisocyanate and 2,6-tolylenediisocyanate at a weight ratio of 80 to 20 were introduced into a round bottom flask, and reacted at 90° C. for 1 hour, to obtain a urethane prepolymer. The thus-obtained urethane prepolymer contained 4.46% of free isocyanate groups.

To a separate flask were introduced 4.50 parts of diethylene triamine and 200 parts of acetone, and to which was added, the drops, over a period of 40 minutes, a solution consisting of 30 parts of acetone in which was dissolved 70 parts of the above urethane prepolymer. During the step of the dropwise addition, the temperature of the reaction mixture rose from 21° to 25° C.

The reaction mixture was heated at 50° C. and reacted for 30 minutes to obtain a solution of polyurethane-urea-polyamine.

To the above solution was then added 28 parts of a methylethyl ketone solution of the blocked isocyanate compound obtained in step (A) of Example 3, reacted at 60° C. for 30 minutes, followed by the addition of 2.23 parts of maleic acid anhydride which was dissolved in 23 parts of methylethyl ketone, and the reaction was conducted at 50° C. for 30 minutes.

To the above reaction product was then added 800 parts of water, which was homogeneously mixed therein, and the organic solvent was distilled off on a hot water bath heated at 50° C. under reduced pressure, and the concentration was adjusted by the addition of water to obtain a homogeneous and stable emulsion having a resin content of about 10% and a pH value of about 6.5.

The heat-treated film prepared from the emulsion in the same manner as described in Example 1 showed the following mechanical properties:

| 100% modulus | Tensile strength | Elongation |
|---|---|---|
| 15 Kg/cm² | 169 Kg/cm² | 830% |

COMPARATIVE EXAMPLE 3

To 304.5 parts of the polyurethane-urea-polyamine solution prepared in the same manner as described in Example 6 there was added a solution consisting of 60 parts of methylethyl ketone in which has been dissolved 5.57 parts of maleic acid anhyride, the solutions were homogeneously mixed together, and the organic solvent was distilled off on a hot water bath heated at 50° C. under reduced pressure.

To the above mixture was then added water to adjust the concentration thereby to obtain a homogeneous emulsion having a resin content of 10% and a pH of about 6.

The heat-treated film prepared from the emulsion in the same manner as described in Example 1 showed the following mechanical properties:

| 100% modulus | Tensile strength | Elongation |
|---|---|---|
| 12 Kg/cm² | 119 Kg/cm² | 860% |

Comparison of Example 6 with Comparative Example 3 indicates that the polymer film obtained in Example 6 (process of the present invention) exhibits superior mechanical properties.

The embodiments of the invention in which an exclusive property or privilege is claimed are defined as follows:

1. A process for preparing an aqueous thermosetting polyurethane emulsion, which comprises:
  1. reacting, the liquid phase and in a ketone solvent, at a temperature of from −20° to +70° C., (A) isocyanate-terminated urethane prepolymer prepared by reacting organic polyhydroxyl component having a molecular weight in the range of from 200 to 10,000 with an excess of organic polyisocyanate, said polyhydroxyl component comprising from 15 to 80 weight % of polyoxyethylene glycol, with (B) an excess of polyalkylene polyamine having at least two primary or secondary amino groups, the total mole number of primary and secondary amino groups in the polyalkylene polyamine being greater than the total mole number of isocyanate groups in the isocyanate-terminated urethane, prepolymer, the reaction being carried out until the presence of —NCO groups cannot be detected, whereby to form polyurethane-urea-polyamine, 2. reacting, in the liquid phase, the reaction product of step 1 with a blocked polyisocyanate having a single free isocyanate group in the molecule, at a temperature of −20° to +70° C., for about 0.5 to 2 hours, 3. adding water to the reaction product of step 2, and 4. treating the product of step 3 to remove the organic solvent therefrom and thereby obtaining an aqueous polyurethane emulsion as a final product.

2. A process according to claim 1, in which between step 2 and step 3, the reaction product of step 2 is reacted, in the liquid phase at a temperature of from 5° to 70° C., for from about 0.5 to about 2 hours, with a cyclic dicarboxylic acid anhydride in an amount of from to moles per mole of the primary and secondary amino groups of the reaction product of step 2.

3. A process according to claim 1, in which the reactant (B) includes up to 50 %, by molecular equivalent, of diamines, or alkyleneoxide adducts, acrylonitrile adducts or acrylate adducts of diamines.

4. A process according to claim 1, in which the ratio of (b) the total mole number of amino groups containing active hydrogen atoms in the polyalkylene polyamine, to (a) the total mole number of isocyanate groups in said urethane prepolymer is in the range of $$1 < \frac{b}{a} \leq 5.$$

5. A process according to claim 1, in which said polyalkylene polyamine has the formula

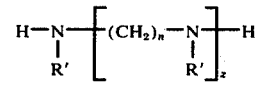

wherein $n$ is an integer larger than one, $z$ is an integer from 2 to 4 and $R'$ is hydrogen, alkyl having one to 4 carbons atoms or hydroxylalkyl having one to 4 carbon atoms.

6. A process according to claim 2, in which said cyclic dicarboxylic acid anhydride is selected from the group consisting of maleic anhydride, succinic anhydride, phthalic anhydride, dihydrophthalic anhydride, tetrahydrophthalic anhydride, hexahydrophthalic anhydride, trimellitic anhydride and itaconic anhydride.

7. An aqueous anionic polyurethane emulsion prepared by the process of claim 1.

8. A polyurethane molded product prepared by forming the emulsion of claim 7 into a molded product and then heat-treating the product to effect crosslinking.

* * * * *

UNITED STATES PATENT AND TRADEMARK OFFICE
CERTIFICATE OF CORRECTION

PATENT NO. : 4 016 121
DATED : April 5, 1977
INVENTOR(S) : Kazuo Matsuda, Hidemasa Ohmura & Takeyo Sakai It is certified that error appears in the above-identified patent and that said Letters Patent are hereby corrected as shown below:

Column 12, line 54; change "reacting, the liquid" to ---reacting, in the liquid---.

Column 12, line 67; change "urethane, prepolymer," to ---urethane prepolymer,---.

Column 13, line 17; change "from to moles" to ---from 0.3 to 1.0 moles---.

Column 14, line 15; change "carbons atoms" to ---carbon atoms---.

Signed and Sealed this

Eighteenth Day of October 1977

[SEAL]

Attest:

RUTH C. MASON
Attesting Officer

LUTRELLE F. PARKER
Acting Commissioner of Patents and Trademarks